United States Patent
Frashure et al.

(10) Patent No.: US 9,563,987 B2
(45) Date of Patent: Feb. 7, 2017

(54) VEHICLE INSPECTION VERIFICATION AND DIAGNOSTIC UNIT

(71) Applicants: Timothy J. Frashure, Columbia Station, OH (US); Richard J. Conklin, Bay Village, OH (US); James P. Porter, Tallmadge, OH (US)

(72) Inventors: Timothy J. Frashure, Columbia Station, OH (US); Richard J. Conklin, Bay Village, OH (US); James P. Porter, Tallmadge, OH (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 74 days.

(21) Appl. No.: 14/041,220

(22) Filed: Sep. 30, 2013

(65) Prior Publication Data
US 2015/0094905 A1 Apr. 2, 2015

(51) Int. Cl.
| | |
|---|---|
| G01M 17/00 | (2006.01) |
| G06F 7/00 | (2006.01) |
| G06F 19/00 | (2011.01) |
| G07C 5/06 | (2006.01) |
| G01M 17/007 | (2006.01) |
| B60T 17/22 | (2006.01) |

(52) U.S. Cl.
CPC ............ G07C 5/06 (2013.01); B60T 17/22 (2013.01); G01M 17/007 (2013.01)

(58) Field of Classification Search
CPC ......... G06F 19/00; G06F 17/00; G01M 17/00; G01M 17/007; G07C 5/00; G07C 5/0816; G07C 5/06; B60T 17/22
USPC ............................. 701/33.2, 29.1; 340/459
See application file for complete search history.

(56) References Cited

U.S. PATENT DOCUMENTS

| | | | |
|---|---|---|---|
| 5,890,080 A * | 3/1999 | Coverdill | B60T 8/885 701/31.4 |
| 6,006,147 A | 12/1999 | Hall et al. | |
| 6,114,952 A | 9/2000 | Francesangeli et al. | |
| 6,363,304 B1 | 3/2002 | Ramsey | |
| 6,526,460 B1 | 2/2003 | Dauner et al. | |
| 6,535,802 B1 | 3/2003 | Kramer | |
| 6,556,899 B1 * | 4/2003 | Harvey | G08G 1/123 340/989 |
| 6,732,031 B1 | 5/2004 | Lightner et al. | |
| 6,747,552 B2 | 6/2004 | Sparacino et al. | |
| 6,757,521 B1 | 6/2004 | Ying | |
| 6,958,611 B1 | 10/2005 | Kramer | |
| 7,255,321 B2 | 8/2007 | Tomioka et al. | |

(Continued)

OTHER PUBLICATIONS

Commercial Vehicle Safety Alliance Inspection Bulletin, Apr. 14, 2011; http://www.cvsa.org/programs/documents/nas/2011/2011-04% 20Antilock%20Brake% 20System%20(ABS)%20 Inspections% 20Revised%2004-14-11.pdf.*
Eric Miller, "Some Truck Inspectors Skip Examinations of Anti-Lock Brake Systems, Official Says," Transport Topics, Oct. 8, 2012, pp. 96 and 98.
"ABS Compliance Tool," Solicitation No. RFI_ABS, Agency: Department of Transportation, Office: Federal Motor Carrier Safety Administration (FMCSA), Location: Headquarters FMCSA, Posted Date: May 7, 2013, pp. 1-7, https://www.fbo.gov/index?s=opportunity&mode=form&id=1943b5851e757f38335520d0aff51266&tab=core&tabmode=list&print_preview=1.

*Primary Examiner* — Isaac Smith
(74) *Attorney, Agent, or Firm* — Fay Sharpe LLP

(57) ABSTRACT

A diagnostic display device is coupled to a vehicle data bus and receives vehicle identification information which is used to identify one or more expected onboard systems installed on the vehicle. Expected systems are queried to determine that they are present and operating properly. Presence and operation status information are stored and/or presented to a user to facilitate automated vehicle system inspection.

29 Claims, 7 Drawing Sheets

(56) References Cited

U.S. PATENT DOCUMENTS

| | | |
|---|---|---|
| 7,274,977 B2 | 9/2007 | Frashure |
| 7,519,758 B2 | 4/2009 | Erhart et al. |
| 7,729,813 B2 | 6/2010 | Frashure |
| 7,751,956 B2 | 7/2010 | Groer et al. |
| 7,987,028 B2 | 7/2011 | Bertosa et al. |
| 7,996,128 B2 * | 8/2011 | Bertosa ................. G07C 5/008 701/31.4 |
| 8,301,329 B2 | 10/2012 | Andreasen et al. |
| 2003/0167345 A1 | 9/2003 | Knight et al. |
| 2006/0235586 A1 | 10/2006 | Waszkowski et al. |
| 2009/0177352 A1 | 7/2009 | Grau et al. |
| 2010/0228404 A1 * | 9/2010 | Link, II .............. G06F 9/44542 701/1 |
| 2011/0022248 A1 * | 1/2011 | McQuade ............. G06Q 10/06 701/2 |
| 2013/0090820 A1 | 4/2013 | Frashure et al. |

\* cited by examiner

VEHICLE INSPECTION VERIFICATION AND DIAGNOSTIC UNIT

BACKGROUND

The present application finds particular application in vehicle troubleshooting systems, particularly involving diagnostic systems. However, it will be appreciated that the described techniques may also find application in other diagnostic systems, other vehicle monitoring systems, or other troubleshooting systems.

Research shows that antilock brake system (ABS) failure in commercial vehicles frequently goes undetected due to inspector inability and/or unwillingness to perform the often complicated and time-consuming system checks. For instance, ABS fault indicator lights that are burned out in vehicles being inspected can indicate that the ABS fault persisted for a lengthy time period before the bulb burned out, and/or that the bulb has been tampered with to hide a faulty ABS from an inspector. Roadside inspectors may verify that the ABS fault indicator is not lit and consider the vehicle safe, but if the ABS fault indicator bulb is burned out there is no way to verify that the ABS is functioning properly.

ABS function is difficult to verify via a roadside inspection in part because of the wide variety of vehicle models, model years, ABS types, etc. When the ABS fails, downstream systems such as electronic stability program (ESP) control, collision mitigation systems, adaptive cruise control systems, etc., can be detrimentally affected. However, to date, the roadside inspector merely checks the ABS light to make sure that it turns on and back off in order to verify that the ABS is functioning properly.

The present innovation provides new and improved systems and methods that facilitate automatically verifying that mandated systems (e.g., ABS and others) are not only present on a vehicle but functioning properly, which overcome the above-referenced problems and others.

SUMMARY

In accordance with one aspect, a diagnostic display device that facilitates automatically verifying mandated system presence and status on a commercial vehicle comprises an interface configured to couple the diagnostic display device to a vehicle data bus and via which vehicle status information is received, and a computer-readable medium that stores a vehicle identification number (VIN) lookup table that cross references VIN numbers to mandated systems. The diagnostic display device further comprises a processor configured to retrieve a VIN for a vehicle to which it is coupled, perform a table lookup to identify one or more systems mandated to be on the vehicle as a function of the manufacture date of the vehicle, query the data bus to verify the presence and operational status of the mandated systems, and output to a display presence and status information for each mandated system.

In accordance with another aspect, a method of vehicle comprises retrieving a vehicle identification number (VIN) for a vehicle via a vehicle data bus, performing a table lookup to identify one or more systems mandated to be on the vehicle as a function of the manufacture date of the vehicle as determined from the VIN, querying the data bus to detect the presence and operational status of the mandated systems, and displaying presence and status information for each mandated system to an inspector.

In accordance with another aspect, an apparatus for automatically verifying mandated system presence and status on a commercial vehicle comprises means for retrieving a vehicle identification number (VIN) for a vehicle via a vehicle data bus, means for performing a table lookup to identify one or more systems mandated to be on the vehicle as a function of the manufacture date of the vehicle as determined from the VIN, means for querying the data bus to detect the presence and operational status of the mandated systems, and means for displaying presence and status information for each mandated system to an inspector.

In accordance with another aspect, a diagnostic display device that facilitates automatically verifying electronic control system presence and status on a commercial vehicle comprises an interface configured to couple the diagnostic display device to a vehicle data bus and via which vehicle status information is received, and a computer-readable medium that stores a vehicle identification number (VIN) lookup table that cross references VIN numbers to specified electronic control systems. The system further comprises a processor configured to retrieve a VIN for a vehicle to which it is coupled, perform a table lookup to identify one or more electronic control systems specified to be on the vehicle as a function of the VIN, query the data bus to verify the presence and operational status of the electronic control systems, and output presence and status information for each electronic control system.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described systems and methods, which provide a hand held unit that checks the serial communications on the vehicle data bus, such as SAE J1939, J1587 or a proprietary protocol, to verify the proper operation of the ABS system as well as the additional systems on the vehicle. The device queries the link to gather information on all of the systems on the link. The device displays and stores the presence of each system and its working status, which facilitates rapid inspection of the status of all systems on the vehicle because no intermediate computer system is necessary. Additionally, the diagnostic device can comprise or access a database comprising information indicating which systems should be on the vehicle based on the vehicle VIN. The device displays a pass/fail indication based on the status of the controllers detected on the link. Further, the device can store all of the status information and vehicle VIN for later download and reporting. The herein-described systems and methods mitigate a need for driver and technician reliance on the individual system lamps and displays in the vehicle to determine individual controller status. In this manner, the described systems and methods provide a single independent device to check the status of all systems connected to the serial communications link the vehicle.

Figure 1:
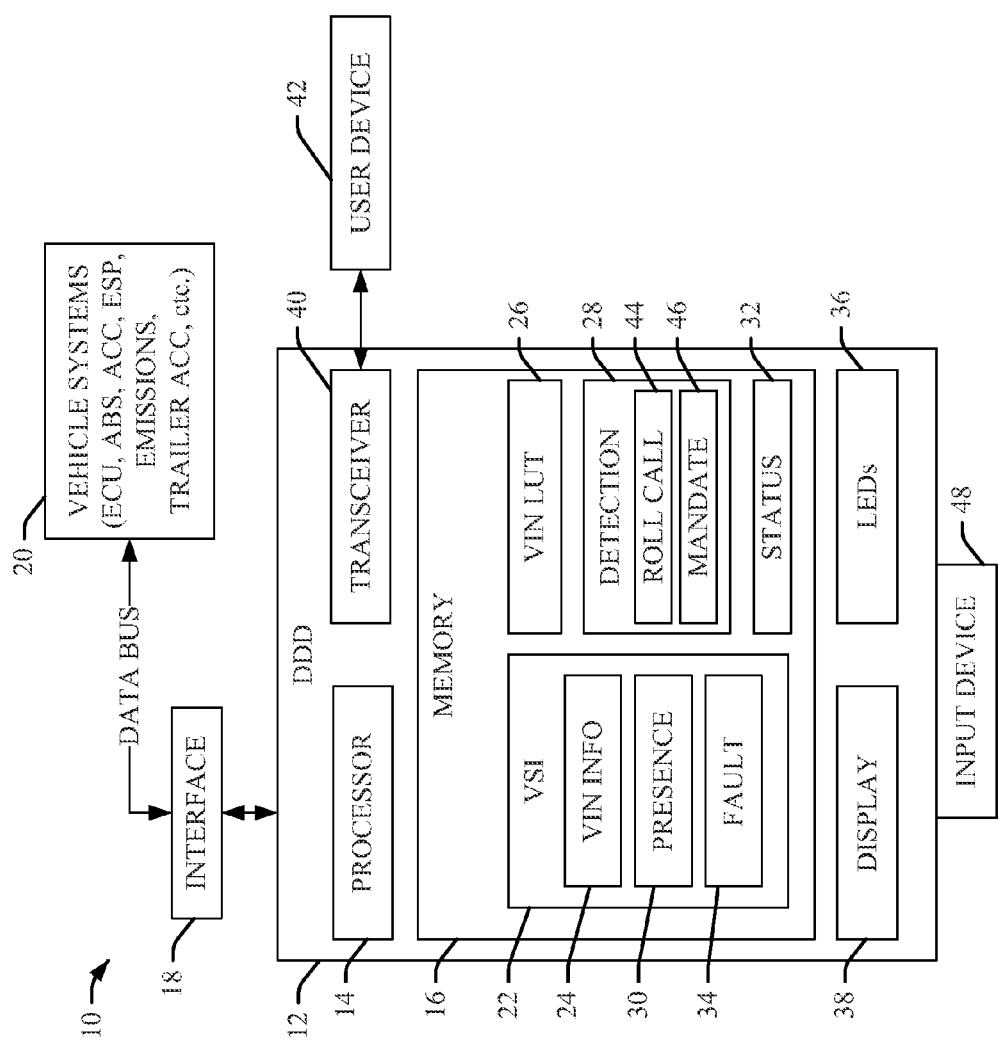
FIG. 1 illustrates a system that facilitates automated system detection and operational status determination, in accordance with one or more aspects described herein.

FIG. 1 illustrates a system 10 that facilitates automated electronic control system detection and operational status determination, in accordance with one or more aspects described herein. The system 10 includes a diagnostic display device 12 comprising a processor 14 that executes, and a memory 14 that stores, computer-executable instructions (e.g., modules, routines, programs, applications, etc.) for performing the various methods, techniques protocols, etc., described herein. In contrast to conventional approaches, the system 10 facilitates quickly, concurrently, and automatically verifying the status of one or a plurality of electronic control systems that are expected on a vehicle, based on the VIN data associated with the vehicle. The system 10 verifies that the expected systems are present and properly functioning in an efficient manner that mitigates a need for conventional manual verification techniques, which are time-consuming and often confusing for inspectors.

The memory 16 may include volatile, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 14. Additionally, "module," as used herein denotes a set of computer-executable instructions (e.g., a routine, sub-routine, program, application, or the like) that is persistently stored on the computer-readable medium or memory for execution by the processor.

The system includes an interface 18 (e.g., a 6-pin connector, a 9-pin connector, or some other suitable connector) via which the diagnostic display device is coupled to a vehicle data bus (e.g., a J1939 data bus, a J1587 data bus, or any other suitable data bus) over which vehicle system presence and status information are received from one or more vehicle systems 20 (e.g. an antilock brake system (ABS), trailer ABS, engine control unit, cruise control system, adaptive cruise control system, electronic stability program, or any other vehicle electronic control system capable of generating a fault that triggers a diagnostic trouble code). The memory 16 also stores vehicle status information (VSI) 22, which comprises VIN information 24 read over the data bus. The processor 14 performs a table lookup on a VIN lookup table 26 stored in the memory 16 in order to identify one or more systems that are expected to be on the vehicle. For instance, given a vehicle's VIN data, the processor determines a year in which the vehicle was manufactured, and from this information determines what control system features would have been mandated to be installed on the vehicle. In another embodiment, the processor determines the systems that are installed on the vehicle directly from the VIN data.

The processor executes a detection module 28 that queries the data bus to determine whether the expected electronic control systems are present on the vehicle. Electronic control system presence information 30 is stored to the memory. The processor also executes a status module 32 that determines whether one or more of the detected electronic control systems is not operating correctly. Fault information 34 is also stores in the memory, and includes operational status information (fault or no fault) for all detected electronic control systems on the vehicle. Once the presence and operational status of the expected systems is determined, the processor outputs the operational status information via one or more output devices. For instance, in one embodiment, the processor activates one or more LEDs 36 to indicate to a user or technician the presence and status of one or more of the electronic control systems. In another embodiment, the diagnostic display device comprises a graphical interface or display 38 on which status and presence information is output to the user. In another embodiment, presence and status information is output to one or more indicators (e.g. lights, LCD panel, audible devices) in an instrument panel in the vehicle. For instance, the processor can be configured to transmit a signal to each mandated system via the data bus to cause each mandated system to activate a respective dashboard indicator to indicate its presence. For example, a lamp could be activated to indicate visibly to an inspector located in the cab that the mandated system is responding to the verification and inspection diagnostic device. It will be understood that the system depicted in FIG. 1 can comprise any or all of the above-described output devices.

In one embodiment, the diagnostic display device comprises a transceiver 40 that communicates with a user device 42 (e.g., a smartphone, tablet, computer, or the like) to present presence and status information to the user. For instance, the presence and status information can be transmitted to the user device via a wireless link (e.g., radio, Bluetooth™, or the like). An application or program stored and executed on the user device receives the status and presence information and presents it to the user via a screen or graphical user interface.

In another embodiment, the memory stores instructions for obtaining electronic control system presence and/or status information in different modes. For instance, a roll call mode 44 of detection can be executed to query the data bus to detect all electronic control systems on the vehicle (e.g., mandated systems, aftermarket systems, etc.). Additionally or alternatively, a mandate mode 46 can be executed to detect only those electronic control systems specified in the lookup table as being mandated to be on the vehicle as of the year of manufacture of the vehicle. Additionally, the diagnostic device can include an input device 48 (e.g., a button, a slide switch, a toggle, a time switch, a magnetic switch, or any other suitable means of switching between detection modes) via which an inspector can switch between roll call and mandate modes. For instance, a time switch can be employed to toggle between roll call and mandate modes (e.g., every 5 seconds, 15 seconds, 30 seconds, or some other predetermined time period).

One advantage of the systems and methods describe herein is illustrated by the following example. A truck built in 2005 in Mexico may have one or more systems installed on it (e.g., emission controls, cruise control, etc.). However, the truck likely does not have all U.S. mandated systems as of 2005. For instance, antilock brake systems were federally mandated in the U.S. in 1998 for commercial vehicles. Accordingly, lookup table stored in the diagnostic display device can be tailored to the country in which it is being used and can identify missing systems when the vehicle is inspected in that country. In the above example, the diagnostic display device employs U.S. mandated system information so that when the Mexican-made vehicle ends up on U.S. roads the device can determine from the VIN and/or the lookup table that the vehicle does not have an ABS installed as mandated in the U.S.

The retrieval of the VIN information 24 and the execution of the detection module 28 and the status module 32 to determine presence and operational status of the expected vehicle systems are described in greater detail with regard to the methods FIGS. 2-7, which are performed by one or more components of the system 10.

Figure 2:
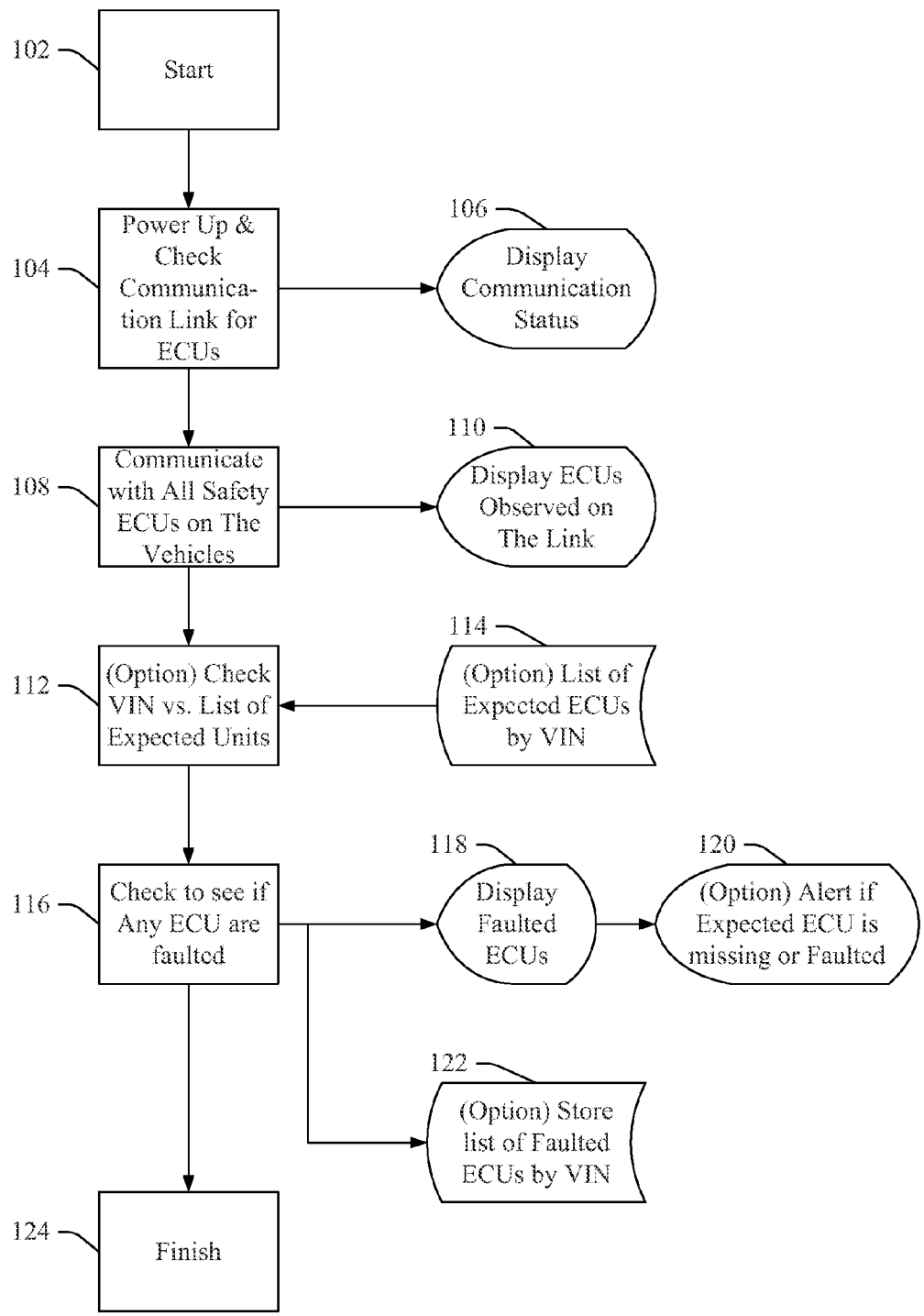
FIG. 2 illustrates a method for automatically verifying the presence and status of onboard systems on a commercial vehicle, in accordance with various aspects described herein.

FIG. 2 illustrates a method for automatically verifying the presence and status of onboard electronic control systems on a commercial vehicle, in accordance with various aspects described herein. At 102, the method is initiated. At 104, the diagnostic display device is powered on (e.g., via coupling to the vehicle communication link) and a vehicle data bus or communication link (e.g., a J1939 bus, a J1587 bus, or the like) is checked. At 106, communication status is displayed. For example, an indication (e.g., a light or graphical representation or the like) is provided to indicate that the diagnostic display device has established communication with the data bus. At 108, diagnostic display device communicates with all electronic control units (ECUs) on the vehicle. At 110, ECUs detected over the data bus are displayed or otherwise indicated to a user. At 112, vehicle identification number (VIN) of the vehicle is read. At 114, a list of expected electronic control systems and/or ECUs is read (or a table lookup is performed) to identify expected systems and/or ECUs associated with the VIN. At 116, each ECU is checked to determine whether it is present and functioning properly or faulted. If one or more ECUs is faulted, at 118, the faulted ECU(s) are displayed. At 120, an alert signal (e.g., a light, sound, or other suitable means of alerting the user) is provided to indicate any expected ECU that is missing or faulted. Additionally, at 122, a list of faulted ECUs is associated with the VIN and stored, e.g. on a computer readable medium. If all ECUs expected to be present given the VIN are accounted for and functioning properly, then at 124, the method terminates. In one embodiment, each of the foregoing steps is performed according to the method. In other embodiments, one or more of 112, 114, 120, and 122 are optional.

Figure 3:
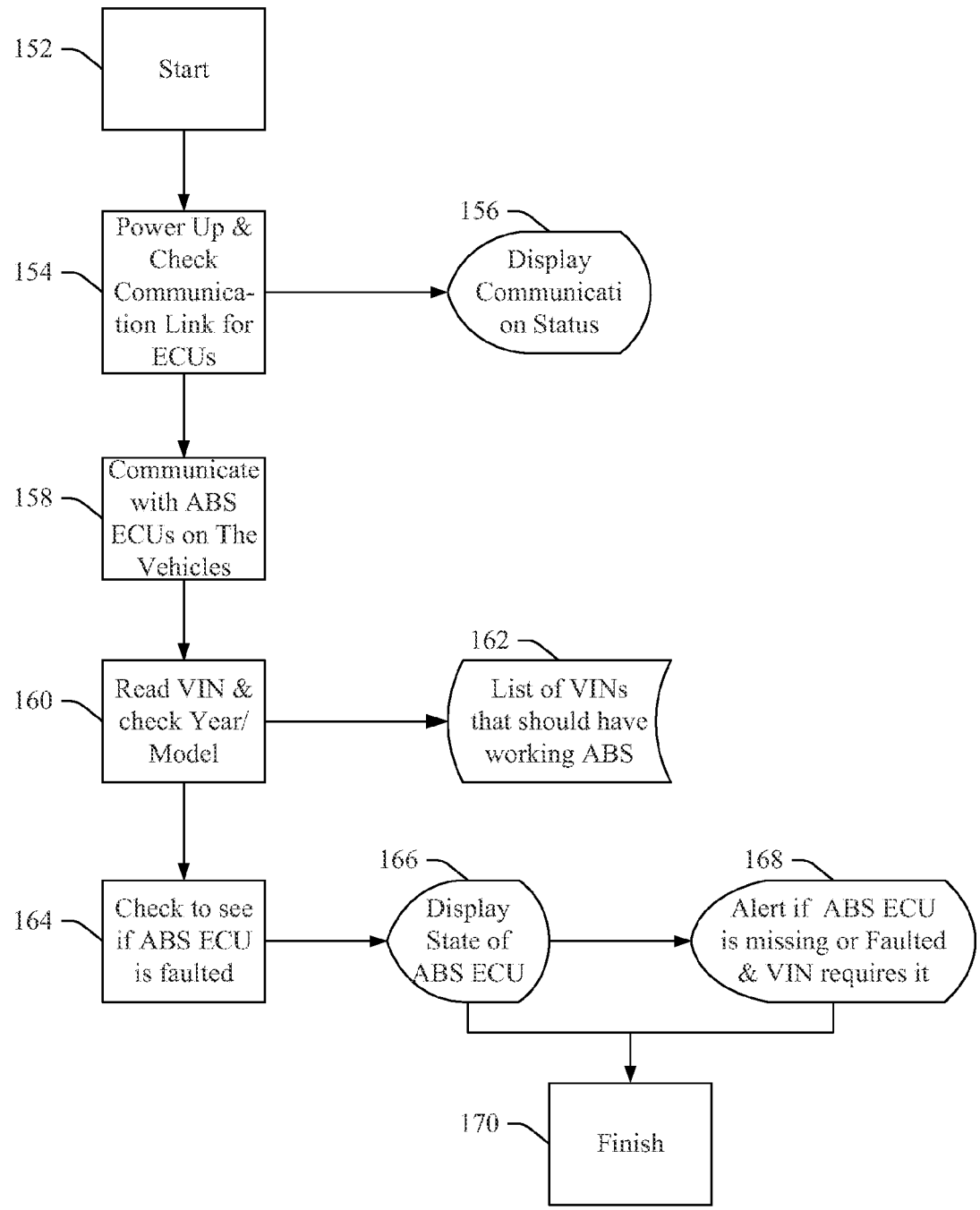
FIG. 3 illustrates a method of identifying the presence and status of an antilock brake system onboard a commercial vehicle, in accordance with one or more features described herein.

FIG. 3 illustrates a method of identifying the presence and status of an antilock brake system onboard a commercial vehicle, in accordance with one or more features described herein. At 152, the method is initiated. At 154, the diagnostic display device is turned on and a vehicle data bus or communication link (e.g., a J1939 bus, a J1587 bus, or the like) is checked. At 156, communication status is displayed. For example, an indication (e.g., a light or graphical representation or the like) is provided to indicate that the diagnostic display device has established communication with the data bus. At 158, diagnostic display device communicates with the ABS electronic control unit (ECU) on the vehicle. At 160, the vehicle identification number (VIN) of the vehicle is read. At 162, a table lookup is performed to determine whether the VIN indicates that the vehicle is expected to have a functional ABS. At 164, ABS is checked to determine whether it is functioning properly or faulted. At 166, ABS status is displayed. At 168, an alert signal (e.g., a light, sound, or other suitable means of alerting the user) is provided to indicate an ABS that is missing or faulted but is otherwise required according to the VIN. At 170, the method terminates.

Figure 4:
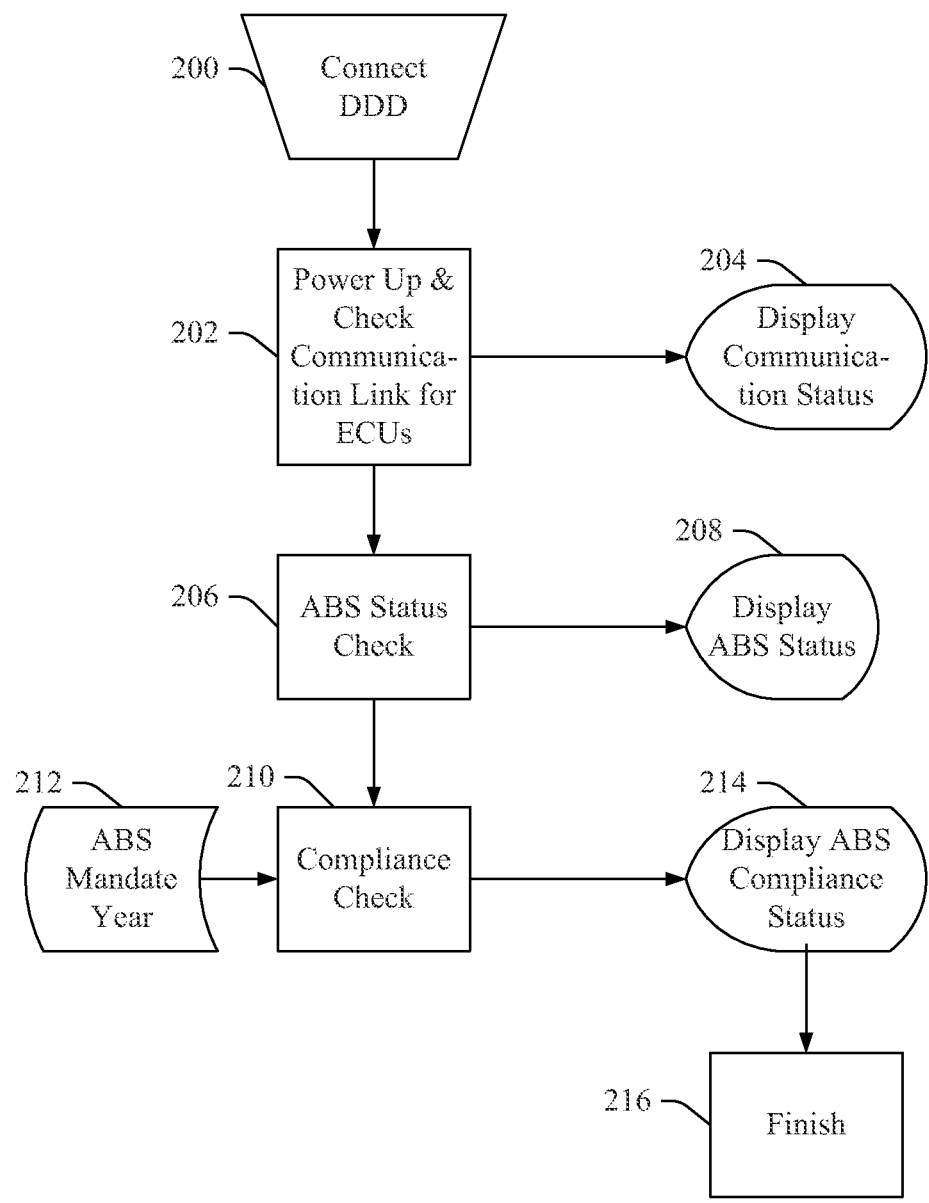
FIG. 4 illustrates a method of identifying the presence and status of an antilock brake system onboard commercial vehicle, in accordance with one or more features described herein.

FIG. 4 illustrates a method of identifying the presence and status of an antilock brake system onboard a commercial vehicle, in accordance with one or more features described herein. At 200, diagnostic display device is connected to the vehicle. Upon connection, for example, a plurality of LEDs or other indicator lights can be lit to indicate various statuses of the diagnostic display device and/or the vehicle systems. For instance, if diagnostic display device power indicator light can show green to indicate that the diagnostic display device is powered up. Indicator lights for ABS presence and compliance or function initially can show red or some other predetermined color.

At 202, the diagnostic display device is turned on and a vehicle data bus or communication link (e.g., a J1939 bus, a J1587 bus, or the like) is checked. At 204, communication status is displayed. For example, an indication (e.g., a light or graphical representation or the like) is provided to indicate that the diagnostic display device has established communication with the data bus. In one embodiment, one or more LEDs on the diagnostic display device can be turned on sequentially, concurrently, or in any other matter to indicate various communication statuses. For instance, a failed power check can be indicated by sweeping LEDs such that the LEDs on the diagnostic display device are sequentially illuminated. If the diagnostic display device fails to establish communication with the data bus, all LEDs on the diagnostic display device can be flashed concurrently or steadily illuminated.

At 206, diagnostic display device checks the status of the ABS electronic control unit (ECU) on the vehicle. At 208, ABS status is displayed. For instance, an ABS indicator LED can be illuminated in different ways to indicate different statuses, such as on to indicate the diagnostic display device has established communication with the ABS, off to indicate that communication could not be established, and flashing to indicate that communication is been established in the ABS is faulted.

At 210, a compliance check is performed. For instance, ABS mandate year information 212 associated with the vehicle can be read, received, input, etc. At 214, ABS compliance status is displayed or otherwise output to the user. For instance, an ABS compliance LED can be illuminated in different ways to indicate different statuses, such as off to indicate that the ABS system complies with the federal regulations for the vehicle year and/or model, or on to indicate that the ABS system is not compliant. At 216, the method terminates.

Figure 5:
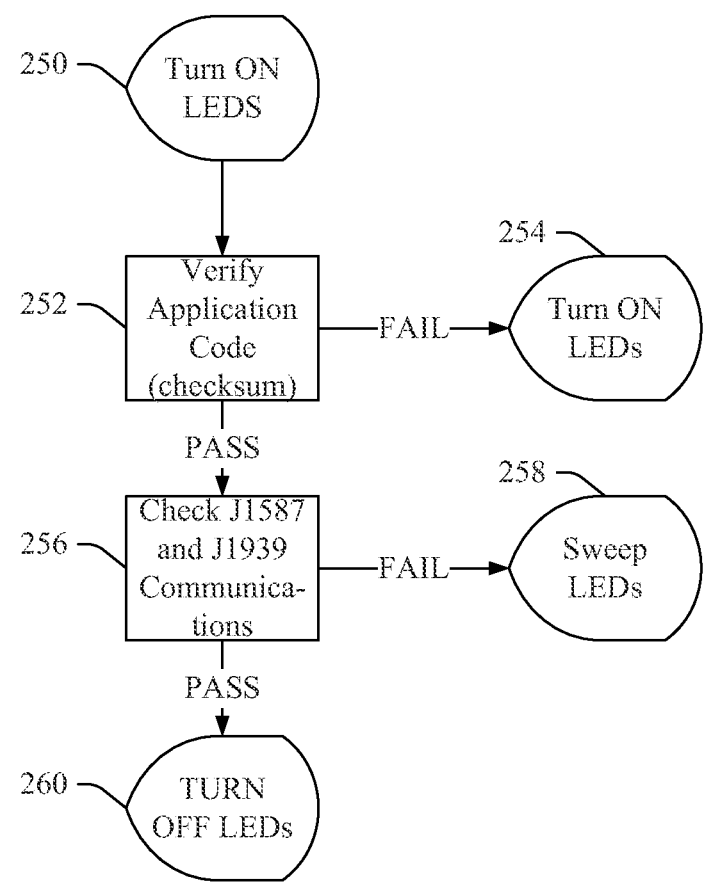
FIG. 5 illustrates a method for verifying a communications link with the data bus on the vehicle, in accordance with one or more aspects described herein.

FIG. 5 illustrates a method for verifying a communications link with the data bus on the vehicle, in accordance with one or more aspects described herein. At 250, diagnostic display device is connected and one or more LEDs are turned on to indicate connectivity. At 252, an application code (e.g. a checksum or the like that is executed upon powering up to ensure proper software operation) is verified. If application code verification fails, then at 254, the LEDs remain in an ON state. If application code verification passes at 252, then at 256, one or more communication links (e.g. J1587, J1939, or the like) are analyzed to determine whether the diagnostic display device can communicate there over with one or more systems on the vehicle. If one or more of the analyzed communication links are unavailable, then at 258, LEDs on the diagnostic display device are sequentially lit or flashed to indicate a failure of the one or more communication links. If all communication links pass the communication link check, then at 260, the LEDs are turned off.

Figure 6:
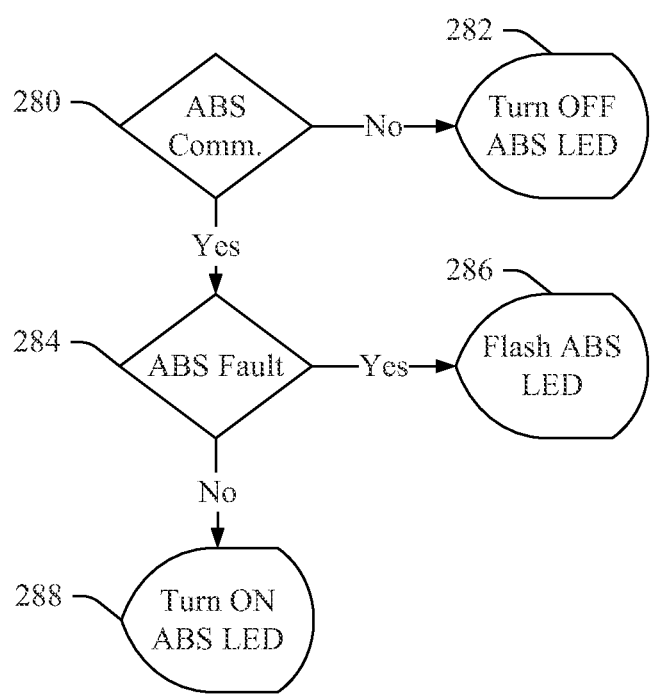
FIG. 6 illustrates a method for determining a status of an ABS communication link on a commercial vehicle, in accordance with one or more aspects described herein.

FIG. 6 illustrates a method for determining a status of an ABS communication link on a commercial vehicle, in accordance with one or more aspects described herein. At 280, ABS communication status is analyzed to determine whether an ABS system is present. If no ABS communication is detected in at 282, the ABS LED is left in an OFF state. If ABS communication is detected at 280, then at 284 a determination is made regarding whether an ABS fault signal is present. If an ABS fault signal is present, then at 286 the ABS LED is flashed. If no ABS fault is detected, then at 288, the ABS LED is steadily illuminated.

Figure 7:
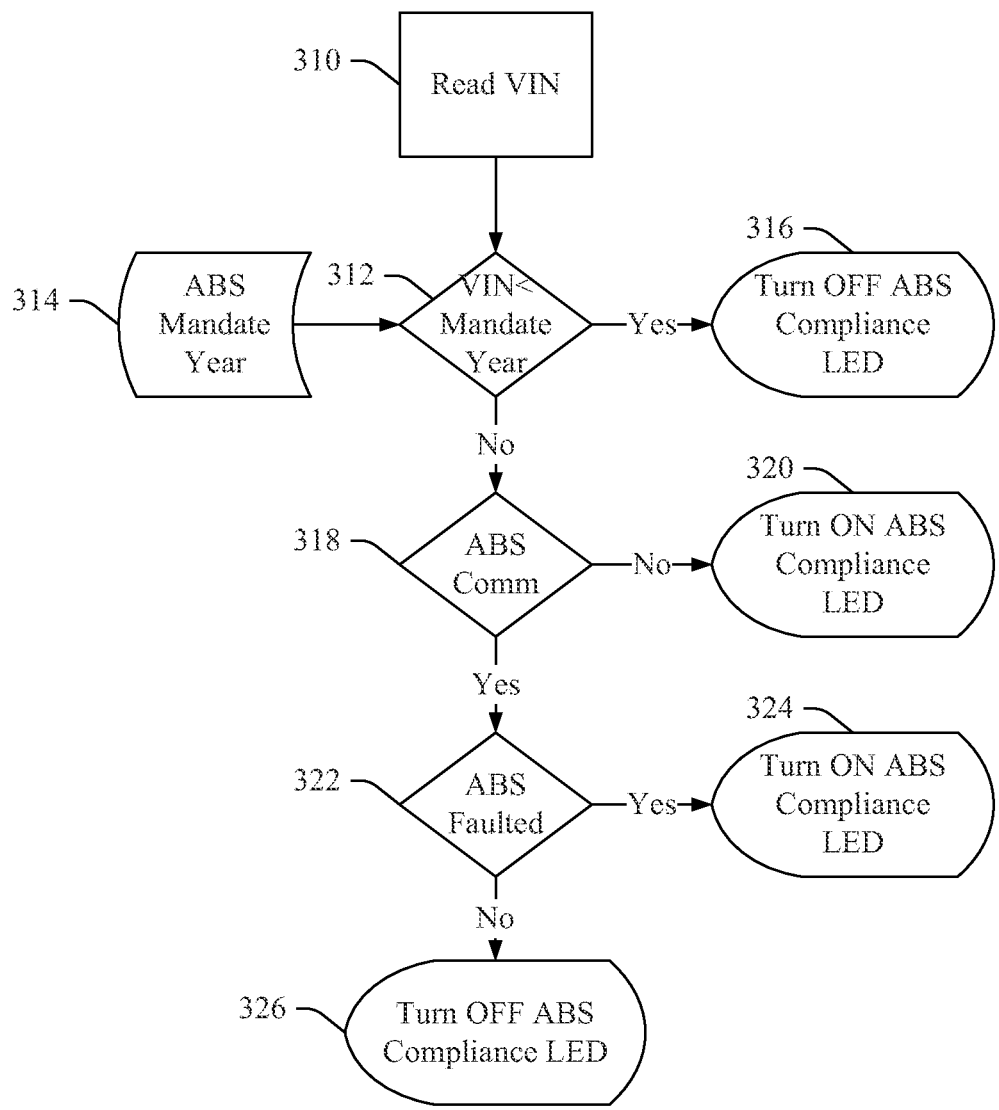
FIG. 7 illustrates a method for automatically determining the presence and status of an antilock brake system on a commercial vehicle, in accordance with one or more aspects described herein.

FIG. 7 illustrates a method for automatically determining the presence and status of an antilock brake system on a commercial vehicle, in accordance with one or more aspects described herein. At 310, a diagnostic display device, which is coupled to the vehicle, reads VIN information from the vehicle. At 312, a determination is made regarding whether the VIN information indicates that the vehicle was built before an antilock brake system mandate year associated with the particular vehicle type. The comparison at 312 may be made by performing a table lookup of ABS mandate year information 314. If the determination at 312 indicates that the vehicle is not subject to the ABS mandate for being built prior thereto, then at 316 the ABS compliance LED is turned OFF or left in an OFF state.

If it is determined at 312 that the vehicle is required to have a functioning ABS because it was built during or after the ABS mandate year, then at 318 a determination is made regarding the status of an ABS communication. If ABS communication is not present, then at 320, the ABS compliance LED is turned ON. If ABS communication is present, then at 322 a determination is made regarding whether the ABS is faulted or functioning properly. If the ABS is faulted, then at 324, the ABS compliance LED is turned ON. If the ABS is not faulted, but rather is functioning properly, then at 326, the ABS compliance LED is turned OFF or left in an OFF state.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A hand-held diagnostic display device that facilitates automatically verifying mandated system presence and status on a commercial vehicle, comprising:
   an interface configured to couple the diagnostic display device to a vehicle data bus and via which vehicle status information is received;
   a computer-readable medium that stores a vehicle identification number (VIN) lookup table that cross references VIN numbers to mandated systems;
   a processor configured to:
      retrieve a VIN from a vehicle to which it is coupled;
      perform a table lookup on the vehicle identification number (VIN) lookup table to identify one or more systems mandated to be on the vehicle as of a manufacture date of the vehicle as determined from the retrieved VIN;
      query the data bus to verify the presence and operational status of the identified mandated systems;
      output to a display presence and status information for each mandated system; and
   wherein the display comprises a plurality of light emitting diodes (LED), including at least one presence LED that indicates that one or more mandated systems is detected on the data bus, and at least one status LED that indicates operational status of the one or more detected systems.

2. The diagnostic display device according to claim 1, further comprising a transceiver that communicates wirelessly with a user device and transmits the presence and status information to the user device for display thereon.

3. The diagnostic display device according to claim 1, wherein the processor is further configured to query the data bus and perform a roll call and detect all electronic control systems installed on the vehicle, including systems that are not mandated, for operational status verification.

4. The diagnostic display device according to claim 3, further including an input device that switches the diagnostic display device between the roll call mode and a mandate mode that detects only the mandated systems as determined by the table lookup.

5. The diagnostic display device according to claim 4, wherein the input device is one or more of a button, a slide switch, a toggle, a time switch, and a magnetic switch.

6. The diagnostic display device according to claim 1, wherein the processor is further configured to output the presence and status information to one or more indicators in an instrument panel in the vehicle.

7. The diagnostic display device according to claim 1, wherein the processor is further configured to transmit a signal to each mandated system via the data bus to cause each mandated system to activate a respective dashboard indicator to indicate its presence.

8. The diagnostic display device according to claim 1, wherein the one or more systems comprise an antilock brake system (ABS).

9. The diagnostic display device according to claim 1, wherein the interface is capable of being coupling the diagnostic display device to at least two different types of vehicle data buses on the vehicle.

10. A method of automatically verifying mandated system presence and status on a commercial vehicle using a hand-held diagnostic display device, comprising:
   retrieving a vehicle identification number (VIN) from a vehicle via a vehicle data bus;
   performing a table lookup on the vehicle identification number (VIN) lookup table to identify one or more systems mandated to be on the vehicle as of a manufacture date of the vehicle as determined from the VIN;
   querying the data bus to detect and verify the presence and operational status of the identified mandated systems;
   displaying presence and status information for each mandated system; and
   wherein displaying the presence and status information comprises selectively illuminating a plurality of light emitting diodes (LED), including at least one presence LED that indicates that one or more mandated systems is detected on the data bus, and at least one status LED that indicates the operational status of the one or more detected systems.

11. The method according to claim 10, further comprising wirelessly transmitting the presence and status information to a user device for display thereon.

12. The method according to claim 10, further comprising querying the data bus and performing a roll call and detecting all systems installed on the vehicle, including systems that are not mandated, for operational status verification.

13. The method according to claim 10, further comprising outputting the presence and status information to one or more indicators in an instrument panel in the vehicle.

14. The method according to claim 10, further comprising transmitting a signal to each mandated system via the data bus to cause each mandated system to flash a respective dashboard indicator to indicate its presence.

15. The method according to claim 10, wherein the interface is capable of coupling the diagnostic display device to at least two different types of vehicle data buses on the vehicle.

16. A non-transitory computer-readable medium having stored thereon instructions for performing the method according to claim 10.

17. A processor configured to execute instructions for performing the method according to claim 10, wherein the processor is switchable between a roll call mode that detects all systems on the vehicle and a mandate mode that detects only the mandated systems as determined by the table lookup.

18. An apparatus that facilitates automatically verifying mandated system presence and status on a commercial vehicle, comprising:
  means for retrieving a vehicle identification number (VIN) from a vehicle via a vehicle data bus;
  means for performing a table lookup on the vehicle identification number (VIN) lookup table to identify one or more systems federally mandated to be on the vehicle as of the manufacture date of the vehicle as determined from a vehicle manufacture date indicated by the VIN;
  means for querying the data bus to detect and verify the presence and operational status of the identified mandated systems; and
  means for displaying presence and status information for each mandated system;
  wherein the means for displaying comprises a plurality of light emitting diodes (LED), including at least one presence LED that indicates that one or more mandated systems is detected on the data bus, and at least one status LED that indicates operational status of the one or more detected systems.

19. A hand-held diagnostic display device that facilitates automatically verifying electronic control system presence and status on a commercial vehicle, comprising:
  an interface configured to couple the diagnostic display device to a vehicle data bus and via which vehicle status information is received;
  a computer-readable medium that stores a vehicle identification number (VIN) lookup table that cross references VIN numbers to specified electronic control systems;
  a processor configured to:
    retrieve a VIN from a vehicle to which it is coupled;
    perform a table lookup on the vehicle identification number (VIN) lookup table to identify one or more electronic control systems specified to be on the vehicle as of a vehicle manufacture date indicated by the VIN;
    query the data bus to verify the presence and operational status of the identified electronic control systems; and
    output presence and status information for each electronic control system;
    wherein the output comprises a plurality of light emitting diodes (LED), including at least one presence LED that indicates that one or more electronic control systems is detected on the data bus, and at least one status LED that indicates operational status of the one or more detected electronic control system.

20. The diagnostic display device according to claim 19, further comprising a transceiver that communicates wirelessly with a user device and transmits the presence and status information to the user device for display thereon.

21. The diagnostic display device according to claim 19, further comprising storing the presence and operational status information of the vehicle in the computer readable medium.

22. The diagnostic display device according to claim 19, wherein the processor is further configured to output the presence and status information to one or more indicators in an instrument panel in the vehicle.

23. The diagnostic display device according to claim 19, wherein the processor is further configured to transmit a signal to each electronic control system via the data bus to cause each electronic control system to activate a respective dashboard indicator to indicate its presence.

24. The diagnostic display device according to claim 19, wherein the electronic control system is one of an antilock brake system (ABS), an engine control system, a cruise control system, an adaptive cruise control system and an electronic stability system.

25. The diagnostic display device according to claim 19, wherein the interface is capable of coupling the diagnostic display device to at least two different types of vehicle data buses on the vehicle.

26. The diagnostic display device according to claim 1, wherein the processor is further configured to identify the one or more mandated systems using only the manufacture date of the vehicle.

27. The method according to claim 10, further comprising identifying the one or more mandated systems using only the manufacture date of the vehicle.

28. The apparatus according to claim 18, wherein the means for performing the table lookup identifies the one or more mandated systems using only the manufacture date of the vehicle.

29. The diagnostic display device according to claim 19, wherein the processor is further configured to identify the one or more specified systems using only the manufacture date of the vehicle.

* * * * *